US005726855A

United States Patent [19]

Mourou et al.

[11] Patent Number: 5,726,855
[45] Date of Patent: Mar. 10, 1998

[54] APPARATUS AND METHOD FOR ENABLING THE CREATION OF MULTIPLE EXTENDED CONDUCTION PATHS IN THE ATMOSPHERE

[75] Inventors: Gerard Mourou, Ann Arbor Twp.; Alan Braun, Ann Arbor, both of Mich.; Jean-Claude Diels, Albuquerque, N. Mex.; Marcel Bouvier, Ann Arbor, Mich.; Xin Miao Zhao, Austin, Tex.

[73] Assignees: The Regents of The University Of Michigan, Ann Arbor, Mich.; The University of New Mexico, Albuquerque, N. Mex.

[21] Appl. No.: 515,761

[22] Filed: Aug. 15, 1995

[51] Int. Cl.$^6$ ................................. H01H 3/22
[52] U.S. Cl. .............................. 361/213; 307/149
[58] Field of Search ........................ 361/212, 213, 361/215, 216, 217, 218, 220, 225, 229, 230, 231, 235; 250/324–326; 307/149

[56] References Cited

U.S. PATENT DOCUMENTS

| | | | |
|---|---|---|---|
| 3,584,260 | 6/1971 | Barbini | 307/149 |
| 3,719,829 | 3/1973 | Vaill | 307/149 |
| 3,775,638 | 11/1973 | Tidman | 307/149 |
| 4,017,767 | 4/1977 | Ball | 307/149 |
| 4,453,196 | 6/1984 | Herr | 361/232 |
| 5,175,664 | 12/1992 | Diels et al. | 361/213 |

FOREIGN PATENT DOCUMENTS 3-222296  10/1991  Japan .

OTHER PUBLICATIONS

*Investigation of long–range self–channeling of intense fs laser pulses in air*, G. Korn, A. Braun, X.Liu, D. Du, J. Squier, and G. Mourou, High Field–Interaction and Short Wavelength Generation, Aug. 1994.

*Use of Self–Trapped Filaments in Air to Trigger Lightning*, X.M. Zhao, J.C. Diels, A. Braun, X. Liu, D. Du, G. Korn, G. Mourou, and J.M. Elizondo, Ultrafast Phenomenon, May 1994.

*Generation of Plasma Channels for Laser–Triggered Lighting*, S. Uchida, Y. Shimada, H. Yasuda, C. Yamanaka, D. Wang, Z.I. Kawasaki, K. Matsu–ura, H. Fujita, Y. Izawa, T. Yamanaka, Y. Ishikubo, N. Shimokura, Wednesday Afternoon/CLEO '94, pp. 209–210, Wednesday Posters.

*Discharge in Gases Guided by Ultrashort Light Pulses*, Xin Miao Zhao, Jean–Claude Diels, Caiyi Wang, Juan Elizondo, CLEO '94, Wednesday Morning, 195–196.

*Self–channeling of high–peak–power femtosecond laser pulses in air*, A. Braun, G. Korn, X. Liu, D. Du, J. Squier, and G. Mourou, Optics Letters, Jan. 1, 1995, vol. 20, No. 1 pp. 73–75.

*Laser plasma channel safely handcuffs lightning bolts*, Paul Mortensen, World News, 1993, pp. 44–45.

*A Femtosecond Lightning Rod*, X.M. Zhao, C.Y. Yeh, J.C. Diels, and C.Y. Wang, Springer Series in Chemical Physics, vol. 55, Ultrafast Phenomena VIII, 1993, pp. 264–267.

*The Laser Lightning Rod System: Thunderstorm Domestication*, Leonardo M. Ball, Applied Optics, vol. 13, No. 10, Oct. 1974, pp. 2292–2296.

*Living with Lightning*, Leslie Lamarre, EPRI Journal, Jan./Feb. 1994, pp. 32–38.

(List continued on next page.)

*Primary Examiner*—Fritz Fleming
*Attorney, Agent, or Firm*—Harness, Dickey & Pierce, PLC

[57] ABSTRACT

An apparatus and method for enabling the creation of multiple extended conduction paths in the atmosphere including a chirped-pulse amplification laser system having a high peak-power laser capable of transmitting through the atmosphere a high-peak power ultrashort laser pulse. The laser pulse is configured to have a rough spacial profile and is of sufficient energy to create multiple electrically conductive ionized channels in the atmosphere.

20 Claims, 4 Drawing Sheets

OTHER PUBLICATIONS

*How Lasers Might Control Lightning Strikes*, Xin Miao Zhao and Jean–Claude Diels, Laser Focus World, Nov. 1993, pp. 113–123.

*Light Pipe for High Intensity Laser Pulses*, C.G. Durfee III and H.M. Milchberg, Physical Review Letters, vol. 71, No. 15, Oct. 11, 1993, pp. 2409–2412.

*Effect of oxygen on the laser triggering of lightning*, Xin Miao Zhao, Patrick Rambo, Jean–Claude Diels, J. Elizondo, CLEO '95/Wednesday Morning, pp. 182–183.

*Laboratory Experiments on laser–plasma guided lightning*, E. Fujiwara, Y. Izawa, S. Nakai, S. Uchida, Y. Shimada, C. Yamanaka, Z.I. Kawasaki, K. Matsuura, T. Nagai, CLEO '93, Monday Morning, pp. 18.

*Discharge in gases guided by ultrashort light pulses*, Xin Miao Zhao, Jean–Claude Diels, Caiyi Wang, Juan Elizondo, CLEO '94, Wednesday Morning, pp. 195–196.

*Generation of plasma channels for laser–triggered lightning*, S. Uchida, Y. Shimada, H. Yasuda, C. Yamanaka, D. Wang, Z.I. Kawasaki, K. Matsu–ura, H. Fujita, Y. Izea, T. Yamanaka, Y. Ishikubo, N. Shimokura, CLEO '94, Wednesday Afternoon. pp. 209–210.

*2–kJ $CO_2$ pulse laser for laser–triggered lightning*, H. Yasuda, S. Uchida, Y. Shimada, C. Yamanaka, D. Wang, Z.I. Kawasaki, K. Matsu–ura, H. Fujita, Y. Izawa, T. Yamanaka, Y. Ishikubo, N. Shimokura, CLEO '95, Wednesday Morning, pp. 181–182.

*Self–channeling of intense femtosecond laser pulses in air*, A. Braun, X. Liu, G. Korn, D. Du, J. Squier, G. Mourou, CLEO '94, Friday Morning, pp. 408–409.

*Highly efficient second–harmonic generation of ultraintense Nd:glass pulses*, Optics Letters Feb 15, 1995, vol. 20, No. 4, pp. 353–355.

APPARATUS AND METHOD FOR ENABLING THE CREATION OF MULTIPLE EXTENDED CONDUCTION PATHS IN THE ATMOSPHERE

This invention was made with U.S. Government support under contract STC-PHY-8920108 awarded by the National Science Foundation. The U.S. Government has certain rights in this invention pursuit to the above-identified contract.

FIELD OF THE INVENTION

The present invention relates generally to apparatus and method for enabling the creation of conduction paths in the atmosphere. More particularly, the present invention relates to laser systems which create multiple extended electrically conductive ionized channels in the atmosphere from a single high-peak power laser pulse.

BACKGROUND OF THE INVENTION

The creation of multiple extended conduction paths in the atmosphere can be used for many different applications. For example, these conduction paths can be used to safely and repetitively control the discharge of lightning strikes before natural breakdown occurs to protect power plants, airports, launch sites, etc. Furthermore, the paths can be used to remotely ground other distant objects, to send a current pulse up through the path to a distant object (for example, to disable a target's electronics), to guide another source such as microwaves or electrons for scientific or defense applications or even to precisely guide arcs in arc-welding applications.

The most important concept needed to discharge lightning is to create an extended high conductivity path for the lightning discharge to follow. One idea to create the conductive path is to literally insert a wire between a cloud and ground that is pulled up by a small rocket. This method only works about 50% of the time and is limited by the number of rockets that can be launched per second.

Lasers can also be used to ionize molecules in the atmosphere creating a plasma column which is used as a conductive path between a cloud and ground. Initial attempts to laser discharge the charge buildup between a cloud and ground used a small focal spot, high intensity $CO_2$ (far infrared) laser to ionize the air. These attempts failed as the plasma produced was too dense to allow further propagation of the laser beam, i.e. the plasma was opaque to the laser beam. Thus a plasma spot, and not a column was created which could not guide the lightning discharge. To avoid the problem of opacity, a very high power (2 kJ) laser having a very large beam size (0.5 m diameter) must be used. By using a very large Cassegrain telescope a long focal length can be achieved. However, a very large and costly laser must be used as well as a very large and costly telescope to focus the light. Another disadvantage of $CO_2$ laser generated plasma columns is that the problem of plasma opacity has not yet been proven to be solved.

Ultraviolet (UV) lasers have also been used to induce lightning discharge. As the ionization intensity for UV is much less than that for far-infrared ($CO_2$ laser), less laser energy is needed to create the plasma conduit. One such device is described in U.S. Pat. No. 5,175,664, issued Dec. 29, 1992 to Diels et al., a co-inventor in the present invention. The Diels device uses femtosecond range UV pulses as the primary ionization producing laser. To keep the plasma column open (against recombination with $O_2^-$ or $O^-$) long enough to induce a lightning discharge, a second long (in the nanosecond range), visible (double Nd:Yag=green) pulse is sent with the UV pulse. This green pulse disassociates any recombined electrons from the oxygen radicals. However, UV light plasma generation has only been demonstrated in lab environments to produce shod plasma columns. Another disadvantage of UV light plasma generation is that only one plasma column is created. A single plasma column generally has a high inductance and therefore the single column must remain open for an extended period in order to induce lightning. In order to produce a low inductance plasma column, an extremely high energy pulse is needed to open a large channel.

Thus, there is a need for a relatively simple apparatus for enabling the creation of multiple extended conduction paths in the atmosphere. There is also a need for an apparatus which can produce plasma columns of length sufficient to induce the discharge of lightning. There is a further need for an apparatus capable of producing an extended plasma column which can induce lightning discharge to proceed without the need for a second long visible pulse to keep the channel open. There is a still further need for an apparatus capable of producing extended plasma columns at a reasonable repetition rate.

SUMMARY OF THE INVENTION

The present invention provides an apparatus for enabling the creation of multiple extended conduction paths in the atmosphere.

One object of the present invention is to provide a relatively simple apparatus and method for enabling the creation of extended conduction paths in the atmosphere.

Another object of the present invention is to provide an apparatus capable of producing multiple extended conduction paths in the atmosphere from a single laser pulse.

It is yet another object of the present invention is to provide an apparatus capable of producing plasma columns of length sufficient to induce the discharge of lightning.

It is a further object of the present invention to provide an apparatus capable of producing multiple extended plasma columns which can induce lightning discharge without the need for a second long visible pulse to keep the channel open.

It is a still further object of the present invention to provide an apparatus capable of running at a reasonable repetition rate producing multiple extended plasma columns during each repetition.

In order to achieve the foregoing objects, the present invention provides an apparatus and method for enabling the creation of multiple extended conduction paths in the atmosphere. The apparatus includes a laser system having a high peak-power laser capable of transmitting through a path in the atmosphere a high-peak power laser pulse. The laser pulse is configured to have a rough (inhomogeneous) spacial profile and to be of energy sufficient to create multiple extended electrically conductive ionized channels in the atmosphere. The laser system is configured to run at a reasonable repetition rate producing multiple extended plasma columns during each repetition.

The laser system includes an oscillator for generating a seed pulse, a stretcher for time stretching the seed pulse, an amplifier for amplifying the stretched pulse and a compressor for time compressing the amplified pulse.

The resultant laser pulse can be passed through a device for forming a rough beam spacial profile, which aids in the formation of multiple filaments.

DETAILED DESCRIPTION OF THE PREFERRED EMBODIMENT

Preferred embodiments of the apparatus and method for enabling the creation of multiple extended conduction paths in the atmosphere and apparatus for controlling the discharge of lightning strikes are described herebelow with reference to the drawings.

Figure 1:
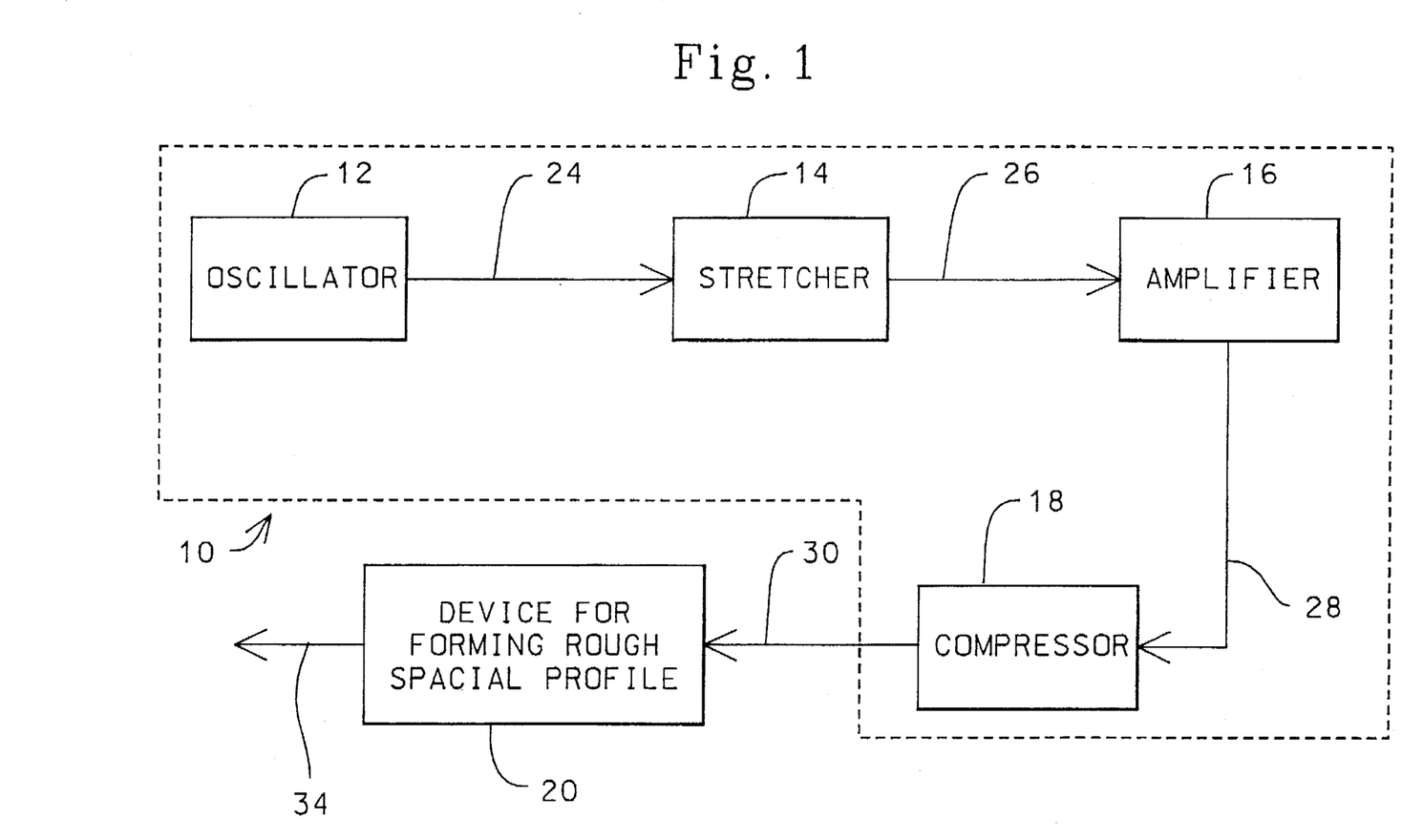
FIG. 1 is a block diagram of one embodiment of a chirped-pulse amplification laser system and device for forming a rough beam spacial profile according to the present invention.

Referring to FIG. 1, the chirped-pulse amplification laser system, indicated generally at 10, includes an oscillator 12, a pulse time stretcher 14, an amplifier 16 and a pulse compressor 18. The oscillator 12 generates an initial seed pulse 24. The seed pulse 24 is time stretched by the stretcher 14 and the stretched pulse 26 is sent to the amplifier 16. The amplifier 16, which runs at a repetition rate of about 10 Hz, amplifies the stretched pulse 26 to produce an amplified pulse 28. Finally, the amplified pulse 28 is compressed by the compressor 18 to produce a compressed pulse 30. The compressed pulse 30 is passed through a device for forming a rough beam spacial profile 20, which aids in the formation of multiple filaments. The resultant pulse 34 is transmitted through the atmosphere to produce multiple extended electrically conductive ionized channels.

Figure 2:
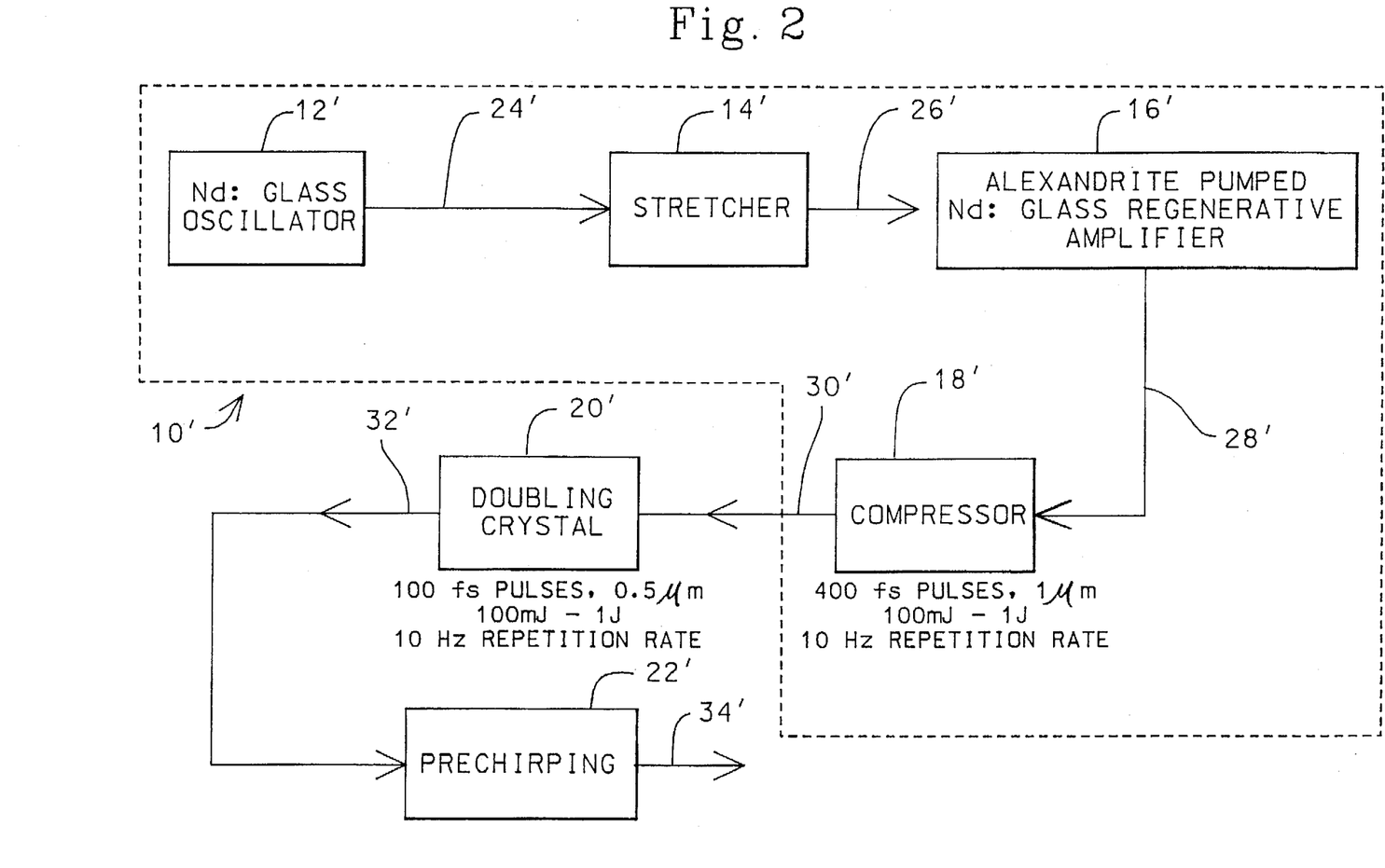
FIG. 2 is a block diagram of an alternate embodiment of a chirped-pulse amplification laser system, having an Nd:glass laser and including a frequency doubling crystal and prechirping.
Figure 3:
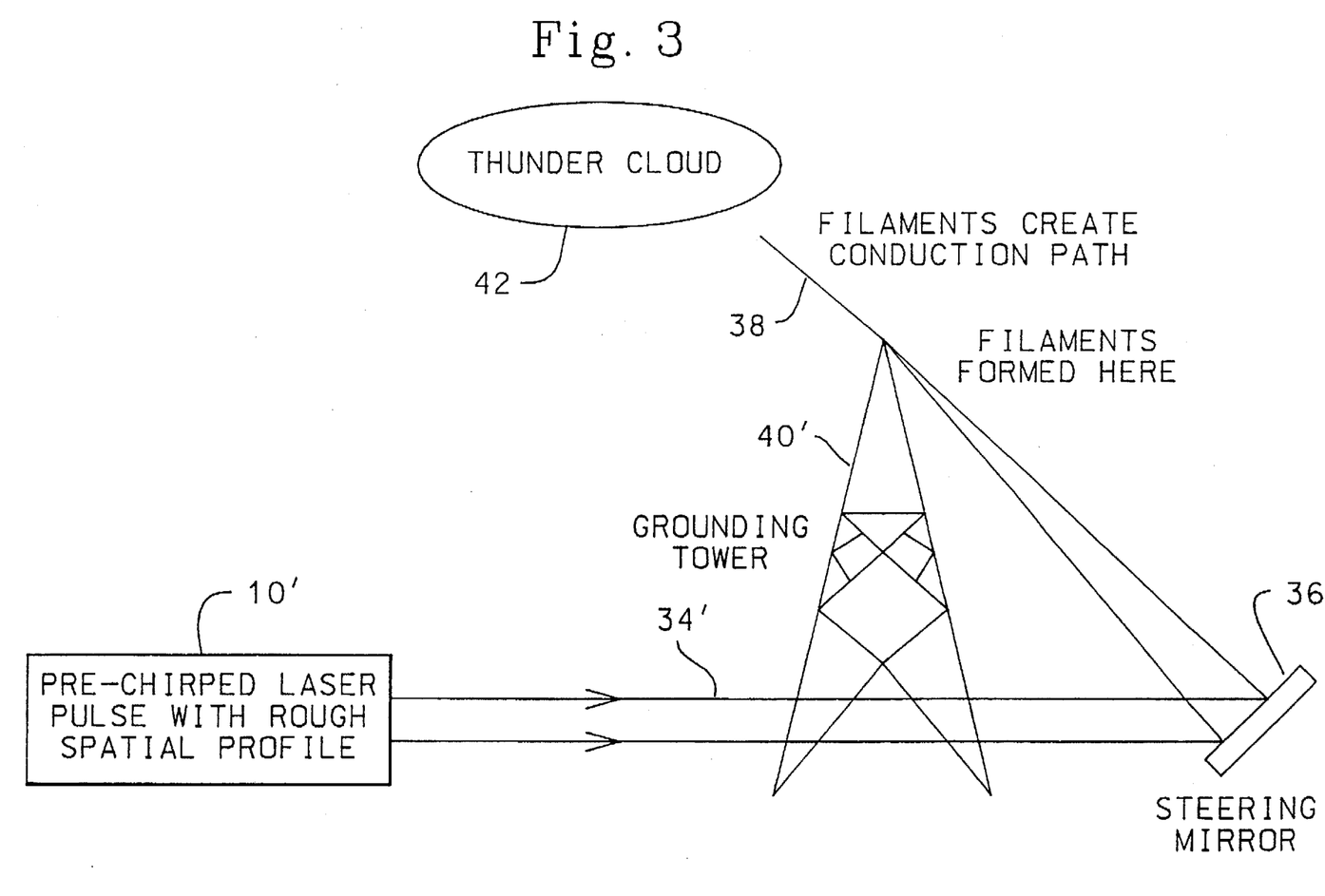
FIG. 3 is a schematic diagram of an apparatus for enabling the discharge of lightning including the laser system shown in FIG. 2.

Referring to FIGS. 2 and 3, a chirped-pulse amplification laser system, indicated generally at 10', includes a diode-pumped Nd:glass oscillator 12', a pulse time stretcher 14', an Alexandrite pumped Nd:glass regenerative amplifier 16' and a pulse compressor 18'. A doubling crystal 20' and a device for prechirping the pulse 22' are also shown. The oscillator 12' generates an initial seed pulse 24' in the range of 100–150 fs at a wavelength of about 1 μm. The seed pulse 24' is time stretched to about 1 ns by the stretcher 14' and the stretched pulse 26' is sent to the amplifier 16'. The amplifier 16', which runs at a repetition rate of about 10 Hz, amplifies the stretched pulse 26' to produce an amplified pulse 28' having an energy of between 50 mJ and 1J. The amplified pulse 28' is compressed to about 400 fs by the compressor 18' to produce a compressed pulse 30'. The compressed pulse 30' is fed into a nonlinear frequency doubling crystal 20' to produce a frequency doubled pulse 32' of about 100 fs and 0.5 μm. The frequency doubled pulse 32' is prechirped by the device for prechirping 22' to produce a prechirped pulse 34'. The prechirped pulse 34' is transmitted through the atmosphere and directed by a steering mirror 36 so that the multiple electrically conductive ionized channels 38 are formed in close proximity to a grounding tower 40. The resultant pulse will produce around 100 filaments or electrically conductive ionized channels. The ionized channels 38 propagate through the atmosphere and extend toward a thunder cloud 42 in which an electrical charge may be building to cause a ground strike. The ionized channels 38 provide a safe high conductivity path to ground through the grounding tower 40 and away from the laser system 10', which induces lightning strikes before natural breakdown occurs.

The doubling crystal 20' performs several important functions, 1) the pulse spectrum is now centered at 0.5 μm (green) which reduces the intensity needed for ionization (generation of the plasma column is easier) and the frequency doubled pulse is well suited for self-channelling; 2) the pulse is shortened from 400 fs to 100 fs, which increases the intensity, while maintaining 80% of the energy; and 3) the resultant beam's spacial profile becomes rough, which is ideal for multiple filament formation. Because the crystal 20' contains surface irregularities, it creates "ripples" or irregularities in the beam spacial profile. The irregularities act as seed which help generate the multiple columns.

While the doubling crystal 20" is preferred, other means for forming a rough beam spacial profile have been contemplated. For example, the pulse may be shined through an aperture having a diameter smaller than the pulse diameter. This would create a "hard" edge. The intensity of the pulse is greatest at the center and decreases radially toward the outer edges. If the pulse edges are "clipped" the "hard edges" cause diffraction to occur as the pulse propagates. The diffraction causes rings or intensity "ripples" to form in the pulse which are seeds where "hotspots" occur. The "hotspots" form seeds from which the columns are formed. It has also been contemplated to shine the pulse through mesh or some other structure which would cause irregularities in the spacial profile.

High peak-power ultrashort pulses with rough spacial profiles sent through greater than five meters of air break up into several "filaments" or "hotspots". Each of these small pieces of the beam propagate undisturbed for many meters creating multiple extended ionized conduction paths.

It is known, due to the wave-nature of light, that a beam with a small spacial diameter will diverge rather quickly. For example, a 100 μm beam diameter will diverge to $100*\sqrt{2}$ μm within 1 cm of propagation (double the beam area). However, in the present invention the 100 μm diameter beam propagates over 20 m in air.

For a high peak-power ultrashort pulse, the peak-power can be strong enough to drive the electrons of the material it is propagating through their linear regime and into a nonlinear regime. In this case, the index of refraction for the material can be written $n(r)=n_o +n_2\, I(r)$, where $n(r)$ is the radially varying index of refraction, $n_o$ is the linear (standard) index of refraction, $n_2$ is the nonlinear refractive index, and $I(r)$ is the radially varying intensity. Since the center of the beam has a higher intensity than the outer edges, the index of refraction varies radially (just as in a regular glass lens), and the pulse experiences a positive lensing effect, even if it is collimated at low powers. This is called self-focusing The critical peak-power needed to start self-focusing is given by $Pcr=\lambda^2/(2\pi n_2)$ which for air is $1.8\times10^9$ W but has been measured to be more like $1\times10^{10}$ W. With an initially smooth spacial beam, only one filament appears at the center of the beam. Once the beam (or part of it) self-focuses, it will not focus to an arbitrarily small size.

It will self-focus until the intensity of the pulse is large enough to ionize the material. This generated plasma reduces the on-axis index of refraction by an amount given by $4\pi e^2 n_e(I)/(2m_e\omega^2)$ where $n_e(I)$ is the intensity dependent generated plasma density, e is the electron charge, $m_e$ is the electron mass, and $\omega$ is the laser frequency. Again, the beam experiences a radially varying index of refraction change (because $n_e(I)$ is radially varying) and the change due to the plasma acts as a negative (defocusing) lens. So, through the balance of the continual self-focusing (positive lens) and the plasma defocusing and natural diffraction (negative lens), the pulse stays confined to a high-intensity, small diameter over many meters of propagation while automatically producing free electrons. This is a "natural" way of generating an extended plasma channel. The only preparation needed from the user is to generate the high peak-power laser pulse.

Each self-focused "hotspot" creates one electrically conductive ionized channel or plasma column in the atmosphere. The plasma columns can be used for many different applications, one such application being to safely and repetitively control the discharge of lightning strikes before natural breakdown occurs to protect power plants, airports, launch sites, etc. The generation of multiple channels is especially important. Because the time needed to pull the lightning discharge is generally fairly long, a second visible green pulse is usually needed to keep a single channel open long enough to discharge the lightning. However, if multiple channels are available, the effective inductance is lower and the discharge can be pulled down more quickly; without the need for a secondary green beam.

The optimal pulse to initiate lightning is accomplished by using the high peak power pulse to generate multiple filaments on a single shot. The laser should operate at a reasonable repetition rate (10 Hz or 100 Hz) in order to "scan" or "smear" a cloud with columns. A smooth beam will only collapse to one filament. The initiation of the filament is from any hotspot or disturbance on the spacial profile. As long as the peak-power is large enough, the initial hotspot will grow exponentially into a self-channelled filament. So to generate multiple filaments, a rough initial spacial profile is needed. To get multiple filaments, with each filament having the critical power for self-focusing ($1\times10^{10}$ W) which implies that each filament will contain roughly 1 mJ of energy (for a 100 fs pulse, as peak power=energy in pulse/pulse duration), then to sustain 100 filaments, the initial pulse needs to have greater than 100 mJ of energy.

Once the filament is formed, it does not last forever. This is because it is continually losing energy from the channel during the propagation. It is losing energy to generate the plasma (ionization process) and to other nonlinear effects. Once the energy has dropped below the self-focusing threshold, the channel will no longer exist. However, the background energy that does not go initially into forming the channel, is continually being fed into the channel to sustain its propagation further than would be expected from calculating the loss per meter of propagation. This is a very important aspect, because the more the background energy there is, the longer the channel can be supported.

In many applications we need to be able to place the start of the channel formation at a desired location, say 100 meters above the laser. This can be achieved by prechirping the pulse. A pulse negatively prechirped (negative dispersion) out to 1 ps (from 100 fs), is recompressed, through the positive dispersion of air, so that the filaments formed 30 meters from the laser as opposed to them naturally occurring 10 m from the laser. Therefore, it is fairly simple to place the filament formation at a desired location.

Figure 4:
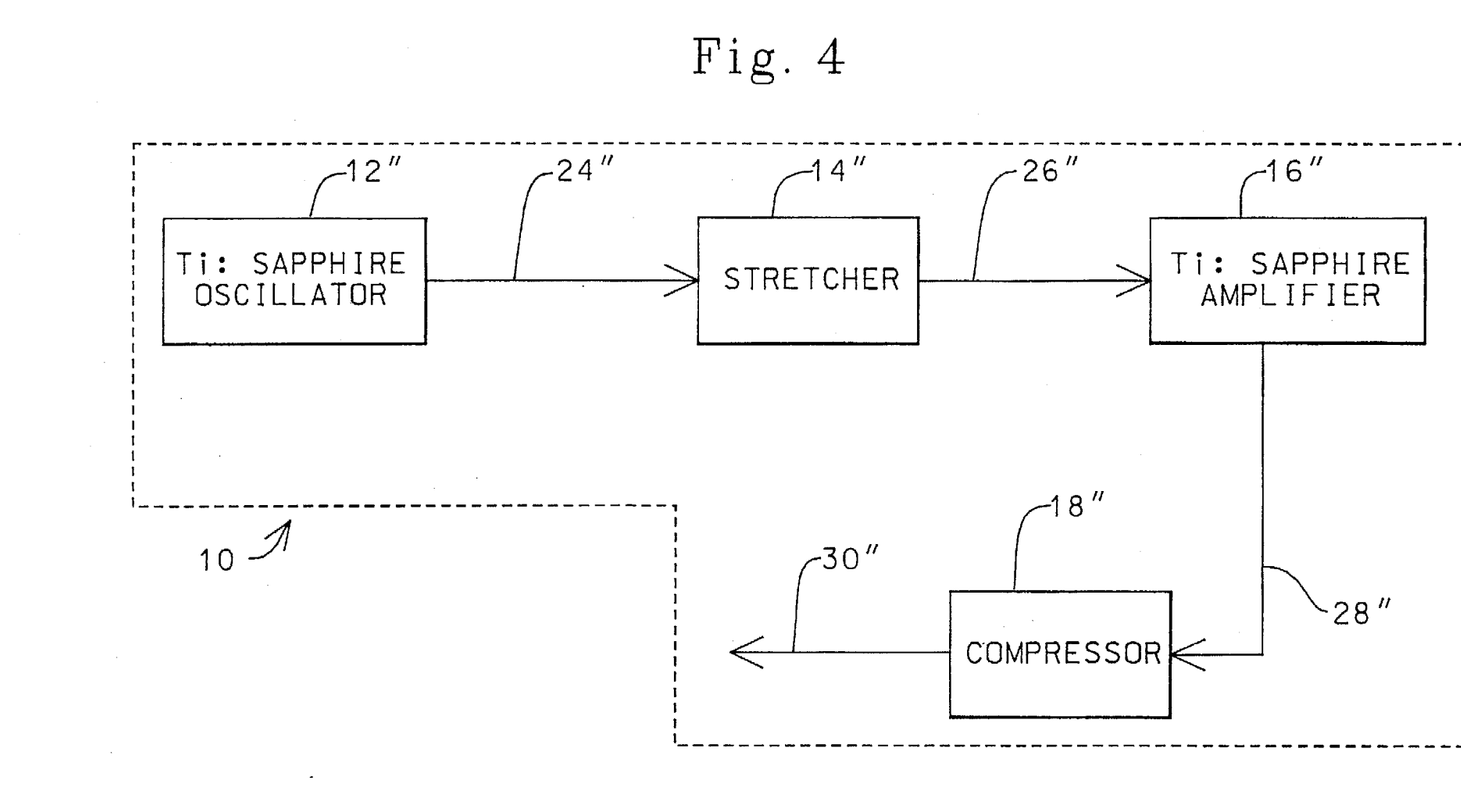
FIG. 4 is a block diagram of an alternate embodiment of a chirped-pulse amplification laser system, having a Ti:sapphire laser and including a frequency doubling crystal according to the present invention.

FIG. 4 shows an alternative embodiment of the chirped-pulse amplification laser system. The chirped-pulse amplification laser system, indicated generally at 10", includes a Ti:sapphire oscillator 12", a pulse time stretcher 14", a Ti:sapphire amplifier 16" and a pulse compressor 18". The oscillator 12" generates an initial seed pulse 24" at 100 fs and having a wavelength of about 800 nm. The seed pulse 24" is time stretched by the stretcher 14" and the stretched pulse 26' is sent to the amplifier 16". The amplifier 16", which runs at a repetition rate of about 10 Hz, amplifies the stretched seed pulse 26''' to produce an amplified pulse 28' having an energy of between 50 mJ and 100 mJ. The amplified pulse 28" is compressed back to about 100 fs by the compressor 18" to produce a compressed pulse 30'. As described in the article entitled "Self-channeling of High-Peak-Power Femtosecond Laser Pulses in Air" by A. Braun, G. Korn, X. Liu, D. Du, J. Squier, and G. Mourou, published Jan. 1, 1995, in *OPTICS LETTERS*, Vol. 20, No. 1, in the article entitled "Investigation of Long-Range Self-channeling of Intense fs Laser Pulses in Air", by G. Korn, A. Braun, X. Liu, D. Du, J. Squier, and G. Mourou, published on Aug. 22, 1994, in *HIGH FIELD INTERACTION AND SHORT WAVELENGTH GENERATION (CONFERENCE)*, #WA3 and in "Highly Efficient Second-Harmonic Generation of Ultraintense Nd:glass Laser Pulses", by C. Y. Chien, G. Korn, J. S. Coe, J. Squier, G. Mourou and R. S. Craxton, published on Feb. 15, 1995, in *OPTICS LETTER*, Vol. 20, No. 4, all three articles incorporated herein by reference, the compressed pulse 30" is transmitted to produce around 5 filaments or electrically conductive ionized channels.

It is to be understood that the invention is not limited to the exact construction illustrated and described above, but that various changes and modifications may be made without departing from the spirit and scope of the invention as defined in the following claims.

We claim:

1. An apparatus for enabling the creation of multiple extended conduction paths in the atmosphere, the apparatus comprising:

a laser system including a high peak-power laser capable of transmitting through a path in the atmosphere at least one high-peak power laser pulse, said laser pulse having a rough spacial profile and being of energy sufficient to create multiple extended electrically conductive ionized channels in the atmosphere.

2. An apparatus according to claim 1 wherein said high peak-powered laser has a repetition rate and said repetition rate of said high peak-power laser is at least 10 Hz.

3. An apparatus according to claim 1 wherein said laser system is a chirped-pulse amplification laser system.

4. An apparatus according to claim 3 wherein said high peak-power laser further comprises an Alexandrite pumped Nd:glass laser.

5. An apparatus according to claim 3 wherein said high peak-power laser further comprises a Ti:sapphire laser.

6. An apparatus according to claim 3 wherein said chirped-pulse amplification laser system further comprises:

means for generating a seed pulse;

means for time stretching said seed pulse;

means for amplifying said stretched pulse; and means for time compressing said amplified pulse.

7. An apparatus according to claim 1 further comprising means for forming said rough spacial profile on said laser pulse.

8. An apparatus according to claim 7 wherein said means for forming said rough spacial profile comprises a frequency doubling crystal.

9. An apparatus according to claim 1 wherein said laser pulse has an energy of at least 20 mJ.

10. An apparatus according to claim 1, wherein said laser pulse is less than 1 ps.

11. An apparatus for controlling the discharge of lightning strikes, the apparatus comprising:

a chirped-pulse amplification laser system including a high peak-power laser capable of transmitting through a path in the atmosphere at least one high-peak power laser pulse, said laser pulse having a rough spacial profile and being of energy sufficient to create multiple extended electrically conductive ionized channels in the atmosphere;

prechirping means for prechirping said pulse so that said ionized channels occur at an extended distance from said laser system;

grounding means for providing a ground path for said lightning strikes away from said laser; and steering means for steering said prechirped laser pulse to create said multiple electrically conductive ionized channels in dose proximity to said grounding means enabling the discharge of lightning strikes through said multiple electrically conductive ionized channels and said grounding means.

12. An apparatus according to claim 11 wherein said chirped-pulse amplification laser system further comprises:

means for generating a seed pulse;

means for time stretching said seed pulse;

means for amplifying said stretched pulse; and means for time compressing said amplified pulse.

13. An apparatus according to claim 11 further comprising means for forming a rough spacial profile on said laser pulse.

14. An apparatus according to claim 13 wherein said means for forming a rough spacial profile comprises a frequency doubling crystal.

15. An apparatus according to claim 11 wherein said grounding means further comprises a grounding tower.

16. An apparatus according to claim 15 wherein said steering means further comprises a steering mirror configured to steer said laser pulse so that said multiple electrically conductive ionized channels in the atmosphere form beginning at an upper end of said grounding tower and extending further into the atmosphere.

17. A method for enabling the creation of multiple extended conduction paths in the atmosphere, the method comprising the steps of:

generating a high-peak power laser pulse; and transmitting through a path in the atmosphere said laser pulse, said pulse having a rough spacial profile and being of energy sufficient to create multiple extended electrically conductive ionized channels in the atmosphere.

18. A method according to claim 17 wherein said step of generating further comprises the steps of:

generating a seed pulse;

time stretching said seed pulse;

amplifying said stretched pulse; and time compressing said amplified pulse.

19. A method according to claim 18 further comprising the step of shining said compressed pulse through a means for forming said rough spacial profile on said compressed pulse.

20. A method according to claim 19 further comprising the step of prechirping said compressed pulse having a rough spacial profile to delay the creation of said multiple extended electrically conductive ionized channels.

* * * * *

UNITED STATES PATENT AND TRADEMARK OFFICE
CERTIFICATE OF CORRECTION

PATENT NO. : 5,726,855
DATED : March 10, 1998
INVENTOR(S) : Gerard Mourou et al.

It is certified that error appears in the above-indentified patent and that said Letters Patent is hereby corrected as shown below:

Column 7, Line 22, Claim 11, after "in" delete "dose" and insert —close—

Column 4, Line 24, after "crystal" delete "20"" and insert —20'—

Signed and Sealed this

Twenty-sixth Day of May, 1998

Attest:

BRUCE LEHMAN

*Attesting Officer*   *Commissioner of Patents and Trademarks*